US010802866B2

(12) United States Patent
Catherwood et al.

(10) Patent No.: US 10,802,866 B2
(45) Date of Patent: Oct. 13, 2020

(54) CENTRAL PROCESSING UNIT WITH DSP ENGINE AND ENHANCED CONTEXT SWITCH CAPABILITIES

(71) Applicant: Microchip Technology Incorporated, Chandler, AZ (US)

(72) Inventors: Michael Catherwood, Georgetown, TX (US); David Mickey, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 230 days.

(21) Appl. No.: 15/141,817

(22) Filed: Apr. 28, 2016

(65) Prior Publication Data

US 2016/0321075 A1 Nov. 3, 2016

Related U.S. Application Data

(60) Provisional application No. 62/154,993, filed on Apr. 30, 2015.

(51) Int. Cl.
*G06F 9/46* (2006.01)
*G06F 9/30* (2018.01)
*G06F 9/4401* (2018.01)

(52) U.S. Cl.
CPC ............ *G06F 9/462* (2013.01); *G06F 9/4401* (2013.01)

(58) Field of Classification Search
CPC .... G06F 9/462; G06F 9/4401; G06F 9/30123; G06F 9/30134
See application file for complete search history.

(56) References Cited

U.S. PATENT DOCUMENTS 5,109,329 A * 4/1992 Strelioff ................ G06F 9/4843
  710/261
6,128,641 A * 10/2000 Fleck .................. G06F 9/30043
  718/108

(Continued)

FOREIGN PATENT DOCUMENTS

WO 2014/159123 A1 10/2014 ............... G06F 9/46

OTHER PUBLICATIONS

Microchip, dsPIC33E Enhanced CPU, Mar. 2014.*

(Continued)

*Primary Examiner* — Aimee Li
*Assistant Examiner* — Kasim Alli
(74) *Attorney, Agent, or Firm* — Slayden Grubert Beard PLLC

(57) ABSTRACT

An integrated circuit device has a first central processing unit including a digital signal processing (DSP) engine, and a plurality of contexts, each context having a CPU context with a plurality of registers and a DSP context, wherein the DSP context has control bits and a plurality of DSP registers, wherein after a reset of the integrated circuit device the control bits of all DSP context are linked together such that data written to the control bits of a DSP context is written to respective control bits of all other DSP contexts and only after a context switch to another context and a modification of at least one of the control bits of the another DSP context, the control bits of the another context is severed from the link to form independent control bits of the DSP context.

30 Claims, 6 Drawing Sheets

(56) References Cited

U.S. PATENT DOCUMENTS

| | | | |
|---|---|---|---|
| 7,282,016 B2 * | 10/2007 | Simonson | A63B 21/156 482/102 |
| 2003/0226001 A1 * | 12/2003 | Moyer | G06F 9/30123 712/228 |
| 2007/0136733 A1 | 6/2007 | Park et al. | 718/108 |
| 2008/0270771 A1 | 10/2008 | Lee et al. | 712/228 |

OTHER PUBLICATIONS

Microchip, dsPIC Language Tools Library, 2004.*
Microchip, Interrupts, Oct. 2013.*
The Linux Information Project, May 28, 2006 (Year: 2006).*
International Search Report and Written Opinion, Application No. PCT/US2016/030141, 10 pages, dated Jul. 26, 2016.
"dsPIC30F Family Reference Manual," Microchip Technology Incorporated, 42 pages, © 2004.

* cited by examiner

Register 2-2: CORCON: Core Control Register

| Upper Byte: | | | | | | | |
|---|---|---|---|---|---|---|---|
| U-0 | U-0 | U-0 | R/W-0 | R/W-0 | R-0 | R-0 | R-0 |
| — | — | — | US | EDT | DL<2:0> | | |
| bit 15 | | | | | | | bit 8 |

| Lower Byte: | | | | | | | |
|---|---|---|---|---|---|---|---|
| R/W-0 | R/W-0 | R/W-1 | R/W-0 | R/C-0 | R/W-0 | R/W-0 | R/W-0 |
| SATA | SATB | SATDW | ACCSAT | IPL3 | PSV | RND | IF |
| bit 7 | | | | | | | bit 0 | bit 15-13  Unimplemented: Read as '0' bit 12    US: DSP Multiply Unsigned/Signed Control bit
          1 = DSP engine multiplies are unsigned
          0 = DSP engine multiplies are signed bit 11    EDT: Early DO Loop Termination Control bit
          1 = Terminate executing DO loop at end of current loop iteration
          0 = No effect
          Note:  This bit will always read as '0'.

bit 10-8  DL<2:0>: DO Loop Nesting Level Status bits
          111 = 7 DO loops active
          •
          •
          001 = 1 DO loop active
          000 = 0 DO loops active bit 7     SATA: AccA Saturation Enable bit
          1 = Accumulator A saturation enabled
          0 = Accumulator A saturation disabled bit 6     SATB: AccB Saturation Enable bit
          1 = Accumulator B saturation enabled
          0 = Accumulator B saturation disabled bit 5     SATDW: Data Space Write from DSP Engine Saturation Enable bit
          1 = Data space write saturation enabled
          0 = Data space write saturation disabled bit 4     ACCSAT: Accumulator Saturation Mode Select bit
          1 = 9.31 saturation (super saturation)
          0 = 1.31 saturation (normal saturation)

bit 3     IPL3: CPU Interrupt Priority Level Status bit 3
          1 = CPU interrupt priority level is greater than 7
          0 = CPU interrupt priority level is 7 or less
          Note:  The IPL3 bit is concatenated with the IPL<2:0> bits (SR<7:5>) to form the CPU interrupt
                 priority level.

bit 2     PSV: Program Space Visibility in Data Space Enable bit
          1 = Program space visible in data space
          0 = Program space not visible in data space bit 1     RND: Rounding Mode Select bit
          1 = Biased (conventional) rounding enabled
          0 = Unbiased (convergent) rounding enabled bit 0     IF: Integer or Fractional Multiplier Mode Select bit
          1 = Integer mode enabled for DSP multiply ops
          0 = Fractional mode enabled for DSP multiply ops

| Legend: | | | |
|---|---|---|---|
| R = Readable bit | W = Writable bit | U = Unimplemented bit, read as '0' | C = Bit can be cleared |
| -n = Value at POR | '1' = Bit is set | '0' = Bit is cleared | x = Bit is unknown |

Figure 3

CENTRAL PROCESSING UNIT WITH DSP ENGINE AND ENHANCED CONTEXT SWITCH CAPABILITIES

RELATED PATENT APPLICATION

This application claims priority to commonly owned U.S. Provisional Patent Application No. 62/154,993, filed Apr. 30, 2015, which is hereby incorporated by reference herein for all purposes.

TECHNICAL FIELD

The present disclosure relates to central processing units (CPU), in particular microcontrollers with CPU and integrated digital signal processing engine (DSP).

BACKGROUND

Embedded systems comprise a central processing unit (CPU), memory and a plurality of peripheral devices to form a single chip system or a single chip microcontroller. A CPU may furthermore be enhanced to have digital signal processing capabilities such as the dsPIC cores manufactured by the Assignee of this application. For example, as shown in FIG. 1A a processing unit may comprise a CPU with an additional digital signal processing (DSP) engine, such as the dsPIC cores manufactured by the Assignee of this application. Detailed information is available, for example, from the reference manual "dsPIC30F Family Reference Manual", data sheet DS70049C, published in 2006 by Microchip Technologies Inc., which is hereby incorporated by reference.

As can be seen, this core has typical digital signal processing capabilities such as an X Data RAM and a separate Y Data RAM and a DSP engine coupled with the RAMs and a register file such that the RAMs can be accessed both in parallel. Other typical elements of this processing core are shown. The DSP engine itself is not a separate core. Rather, the DSP engine enhances the CPU with additional DSP typical instructions. In addition this conventional DSP enhanced microcontroller shows in FIG. 1A at the bottom certain peripheral devices coupled through the system bus with the core. FIG. 1B shows a more detailed block diagram of the DSP engine of the block diagram of FIG. 1A. The processing core as shown in FIGS. 1A and 1B is a single processing core that comprises digital signal processing capabilities. It can be used in multi-core device as one of the cores.

SUMMARY

There exists a need for an improved context switch capabilities of such devices.

According to an embodiment, an integrated circuit device may comprise a first central processing unit including a digital signal processing (DSP) engine, and a plurality of contexts, each context comprising a CPU context comprising a plurality of registers and a DSP context, wherein the DSP context comprises control bits and a plurality of DSP registers, wherein after a reset of the integrated circuit device the control bits of all DSP context are linked together such that data written to the control bits of a DSP context is written to respective control bits of all other DSP contexts and only after a context switch to another context and a modification of at least one of the control bits of the another DSP context, the control bits of the another context is severed from the link to form independent control bits of the DSP context.

According to a further embodiment, the control bits can be part of a control register. According to a further embodiment, the control register may comprise non-DSP bits that are not part of a DSP context and are not linked. According to a further embodiment, after a reset of the integrated circuit device all registers of a DSP context can be linked together such that data written to one register of a DSP context is written to respective registers of all other DSP contexts and only after a context switch to another context and a modification of the control register of the another DSP context, the registers of the another context are severed from the link to form independent registers of the DSP context. According to a further embodiment, the DSP context registers may comprise at least a predefined number of bits of a status register indicating a status of the DSP engine. According to a further embodiment, the plurality of DSP registers may comprise at least one accumulator. According to a further embodiment, the plurality of DSP registers may comprise at least one working register that is not part of the CPU context which are used for the DSP engine. According to a further embodiment, the plurality of DSP registers may comprise at least one further working register that is not part of the CPU context. According to a further embodiment, the control bits can be part of a DSP engine control register operable to control and configure the DSP engine. According to a further embodiment, the DSP engine control register may comprise loop control bits, accumulator control bits, and at least one multiplier control bit. According to a further embodiment, the DSP engine control register may further comprise a CPU interrupt priority control bit. According to a further embodiment, the DSP engine control register may comprise a program space visibility control bit. According to a further embodiment, modification of the at least one accumulator after a context switch does not trigger a severance of an associated DSP context. According to a further embodiment, after severance of a DSP context a subsequent reset of the integrated circuit device may again link all DSP control bits. According to a further embodiment, the integrated circuit device may further comprise a second central processing unit. According to a further embodiment, the second central processing unit operates as a master and the first central processing unit operates as a slave. According to a further embodiment, the first central processing unit is a processing unit of a first microcontroller unit of the integrated circuit device and the second central processing unit is a processing unit of a second microcontroller unit of the integrated circuit device. According to a further embodiment, the first microcontroller unit comprises random access program memory that is configured to be loaded by the second central processing unit through an interface coupling the second microcontroller unit and the random access program memory.

According to another embodiment, a method for operating an integrated circuit device comprising a first central processing unit including a digital signal processing (DSP) engine, may comprise: providing a plurality of contexts, each context comprising a CPU context and a DSP context, wherein the DSP context comprises control bits and a plurality of DSP registers, resetting the integrated circuit device, wherein a reset cause the control bits of all DSP contexts to be linked together such that data written to a current DSP control bit is written to control bits of all other DSP contexts; and switching to another context and modifying of at least one control bit of the DSP context of the another context, wherein the control bits of the another context are severed from the link to form an independent control bits.

According to a further embodiment of the method, the control bits can be part of a control register. According to a further embodiment of the method, the control register may comprise non-DSP bits that are not part of a DSP context and are not linked. According to a further embodiment of the method, after a reset of the integrated circuit device all registers of a DSP context are linked together such that data written to one register of a DSP context is written to respective registers of all other DSP contexts and only after a context switch to another context and a modification of the control register of the another DSP context, the registers of the another context are severed from the link to form independent registers of the DSP context. According to a further embodiment of the method, the DSP context may comprise at least a predefined number of bits of a status register indicating a status of the DSP engine. According to a further embodiment of the method, the DSP context comprises at least one accumulator. According to a further embodiment of the method, the DSP context may comprise at least one working register used for the DSP engine that is not part of the CPU context. According to a further embodiment of the method, the DSP context may comprise at least one further working register that is not part of the CPU context. According to a further embodiment of the method, the method may further comprise controlling the DSP engine with the control register comprising said control bits. According to a further embodiment of the method, modification of the at least one accumulator after a context switch does not trigger a severance of an associated DSP context. According to a further embodiment of the method, after severance of a DSP context a subsequent reset of the integrated circuit device again links all DSP control bits

BRIEF DESCRIPTION OF THE DRAWINGS

FIG. 3 shows core control register according to various embodiments.

DETAILED DESCRIPTION

Conventional microcontrollers with DSP capabilities, such as the dsPIC33 family provide for CPU context switching that is limited to the CPU W-registers, assuming that all DSP operations would be performed within only one context. As system complexity increases with increasing device performance, there is a need to support DSP application code within multiple DSP contexts wherein, the DSP engine configuration for all DSP contexts may not always be consistent. There is a need for a separate DSP engine within a processing device, such as DSP engines incorporated within dsPIC devices, to execute DSP code within more than one context, wherein DSP engine configuration will be assumed to be consistent. To maintain backwards code compatibility, an elegant means to default to the same usage model is required.

According to various embodiments, a method and device adding DSP context switching with independent DSP engine configuration within each context for a single or multi-core, in particular dual-core, microcontroller can be provided, while not breaking backwards code compatibility.

According to various embodiments, a DSP context is added to the existing context switching mechanism and support for independent DSP context configuration is provided. In addition, backwards compatibility with existing application code can be maintained that already executes DSP code in more than one context (using the same DSP engine configuration).

According to an embodiment, an interrupt based, transparent hardware context switching is provided. This architecture expands a conventional CPU context switch with DSP context. Thus, a DSP context is basically added to the CPU context. According to some embodiments, context switching occurs in the background during exception processing (i.e., with zero overhead). In other words, the CPU does not need to execute any additional instructions to save the context. This, may greatly reduce context switching time in applications with concurrent DSP processes. A DSP engine configuration may, thus, be different in each context.

Figure 1A:
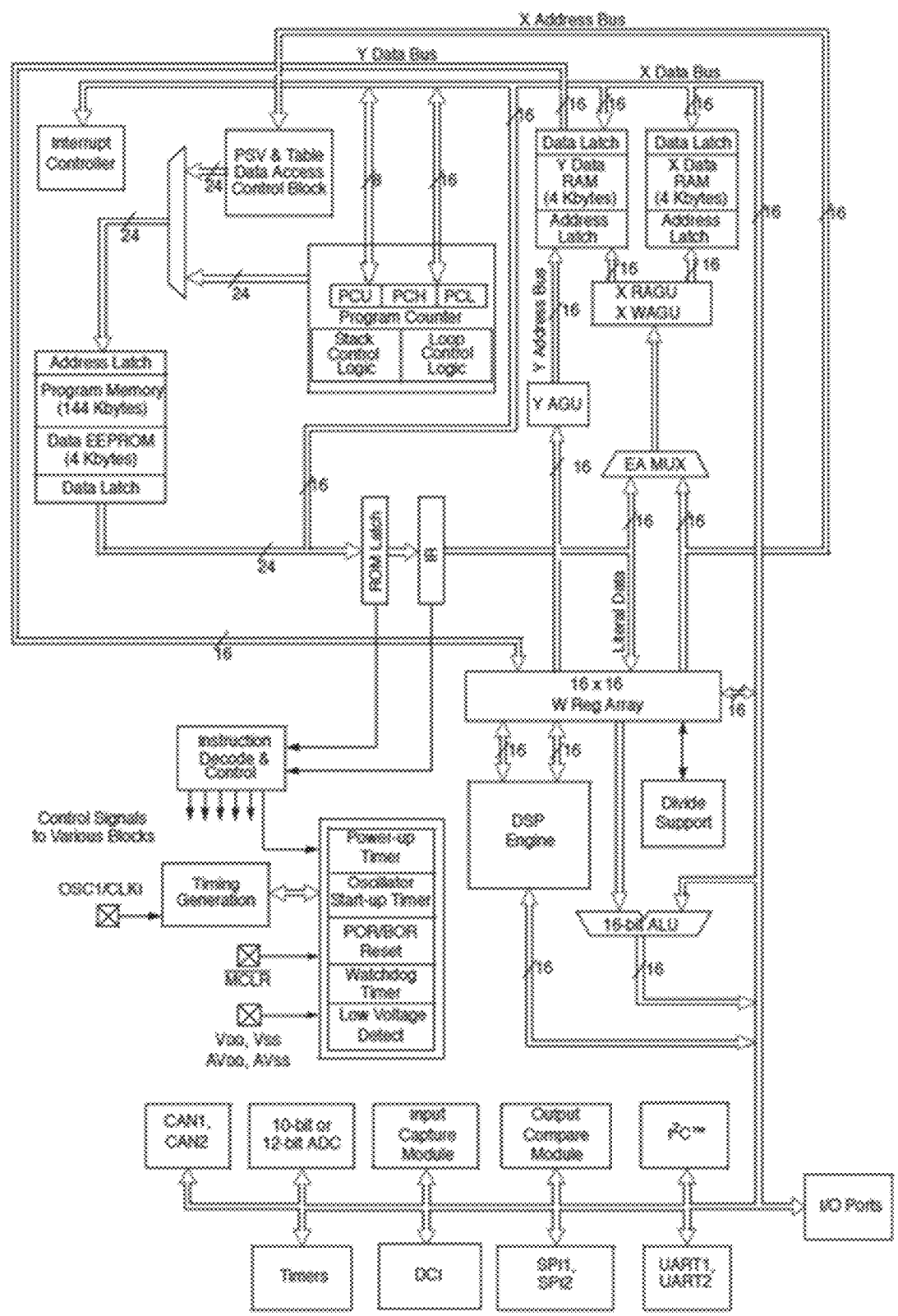
FIG. 1A shows a block diagram of a conventional DSP enhanced microcontroller.
Figure 2:
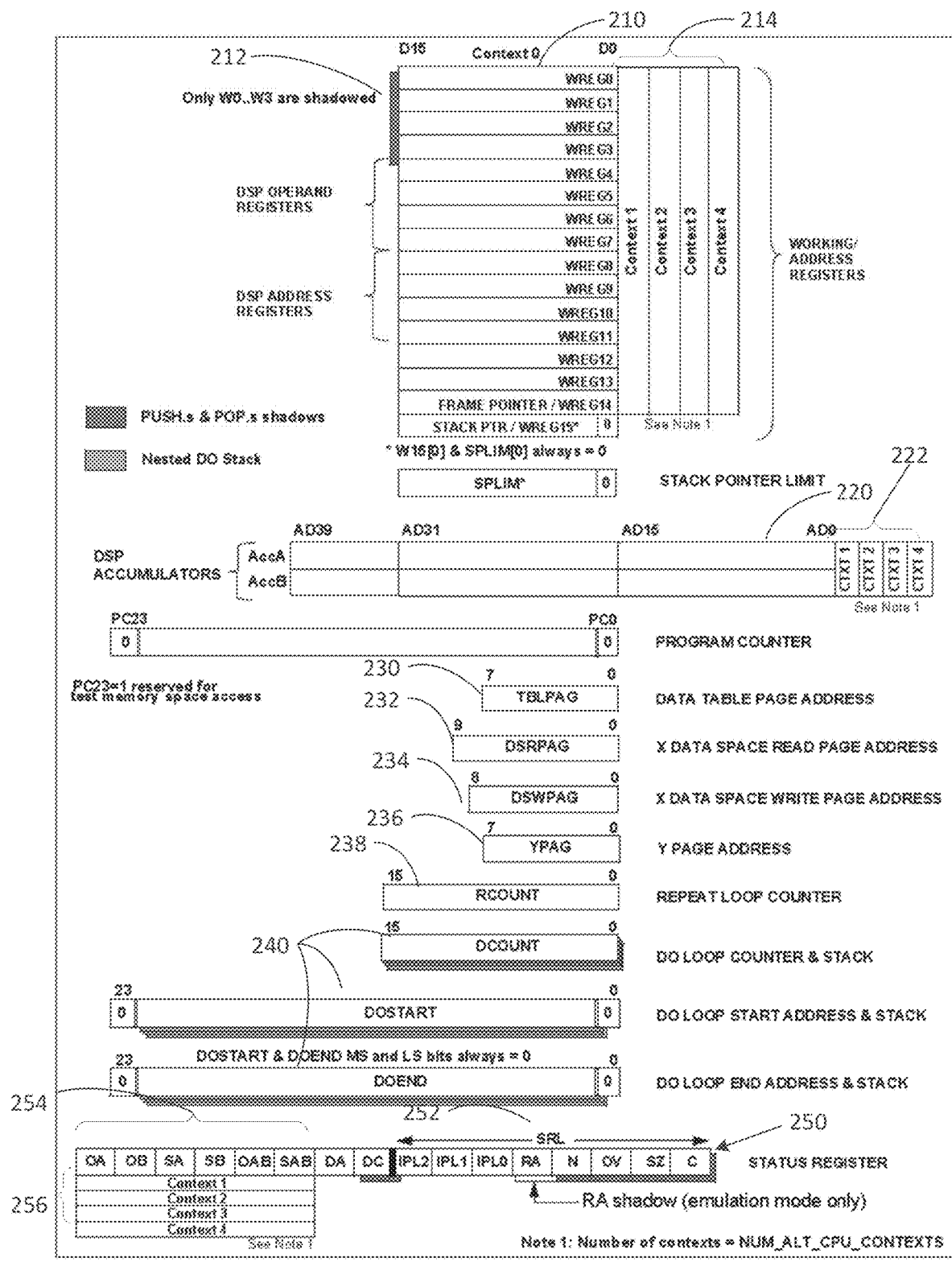
FIG. 2 shows a programmers model according to various embodiments.

FIG. 2 shows registers of the core, such as the working registers of the register file 210 and accumulator 220 of the DSP engine as well as other typical DSP registers as used in a DSP core as shown in FIG. 1A. For example, FIG. 2 shows data table page address register 230, X data space read page address register 232, X data space write page address register 234, Y page address register 236, repeat loop counter register 238, Do LOOP registers 240, and status register 250. In addition, FIG. 2 shows enhancements according to various embodiments.

A conventional processing core with a DSP engine, such as the one implemented in dsPIC cores comprises a CPU context that includes registers W0 through W3 and the lower portion 252 (LS byte) of status register 250, shown as SRL in FIG. 2, which is stacked during exception processing on a stack not shown in FIG. 2. For registers W0 to W3 are plurality of additional shadow registers 212 may be provided for each context.

An improved CPU/DSP context includes the conventional CPU context (shadow registers 212) plus a DSP context. Thus, a combined CPU/DSP context may include, for example, the registers: W0 through W14 for which additional context register files 214 are provided, accumulators AccA, AccB 220 for which additional context accumulators 222 are provided, and the upper portion 254 of status register SR (MS byte, DSP status), including the upper portion 254 with bits OA, OB, SA, SB, OAB, and SAB for which additional context register 256 are provided. The lower byte 252 of the status register 250 (LS byte) is again stacked during exception processing. Furthermore, the DSP context may include the DSP control register CORCON 260 including at least its flags US, SATA, SATB, SATDW, ACC SAT, RND, IF as shown, for example, in FIG. 3. The control register 260 may furthermore be configured as shown in FIG. 3 and comprise an early Loop termination control bit EDT, DO Loop nesting level status bits, an interrupt priority level status bit, and a program space visibility in data space enable bit PSV. The US bit is used to control whether the DSP engine multiplies in signed or unsigned mode. The EDT bit controls early termination at the end of a current loop iteration. The DL bits control the loop nesting level status. SATA, SATB, and SATDW control the saturation function of the accumulators and data space registers, respectively. The ACCSAT bit controls the saturation mode of the accumulator. The IPL3 bit selects a CPU interrupt priority level. The PSV bit controls whether the program space is visible in data space or not. The RND bit controls a rounding mode and the IF bit controls a multiplication mode.

The particular embodiment shown in FIGS. 2 and 3 may provide for 4 additional contexts CTXT0 . . . CTXT4. Other DSP designs may provide for a different DSP context depending on the respective design and, in particular, more or less stacked registers. Similarly a different CPU type may include different registers for the CPU and/or DSP context.

Figure 4:
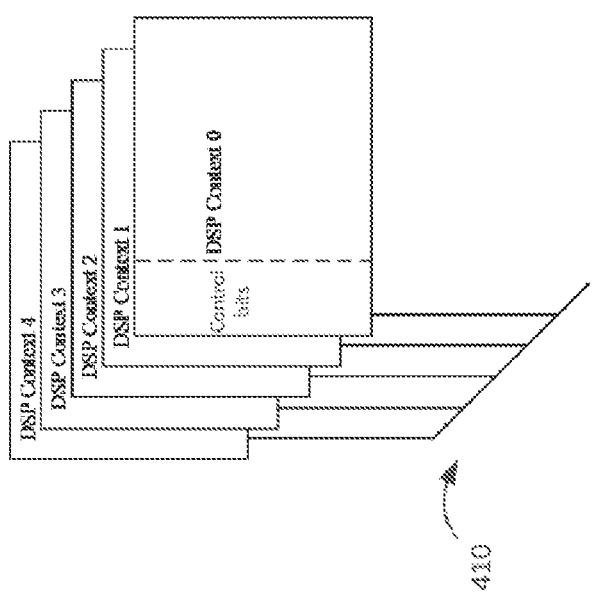
FIG. 4 shows a first exemplary configuration of a plurality of DSP contexts.

After exiting a reset, all writes to the background DSP control register, in the example shown in FIGS. 2 and 3, the CORCON (DSP control only) register will be replicated within all DSP contexts. This scenario is shown in FIG. 4. The DSP contexts are all linked and writing to the current DSP context 0 will be replaced in all other DSP contexts DSP context 1 . . . 4. Thus, initially after a reset, the core behaves exactly the same as a previous core that does not provide separate contexts for the DSP engine.

According to an embodiment, it is assumed that there will be five different contexts CTXT 0 . . . 4 available. Each context comprises a CPU context with shadowed registers and a DSP context. However as stated above, the additional contexts for the DSP are not yet completely visible after a reset because the content of the DSP contexts are linked to some extent and therefore all DSP contexts comprise the same essential information as stored in the control bits. Thus, while five sets of active and shadow registers and a stack are available, only the five active and shadow registers for the CPU are truly independent. In other words, only shadow registers for 212 are not linked. According to one embodiment, certain registers of the DSP engine are independent but their associated control bits of a DSP control register are not. Initially, after reset while there are also five DSP contexts as shown in FIG. 4, at least the control bits of these five DSP contexts are initially linked and not individually changeable as shown with the dotted line. Thus, according to one embodiment the DSP related bits of the control register CORCON as shown in FIG. 3 are identical for all contexts. As long as no context switch happens, any change of these control bits in a DSP context will automatically be transferred to all other DSP contexts. According to another embodiment, this linking functionality is extended to all registers and control bits of a DSP context.

According to an embodiment, as mentioned above the context linking may only apply to the DSP parts of the CORCON register. Changes to any other DSP context registers may not be replicated through to the other contexts and those the DSP context with respect to those registers is not linked. However, according to other embodiments, this principle applies to the entire DSP context. This is indicated in FIG. 4 by the link 410 that couples all contexts according to one embodiment or all control bits according to another embodiment. According to an embodiment, the same may be true if only the accumulators 220 are altered in any DSP context according to various embodiments. Thus, in such an embodiment after a reset, any change to accumulators 220 will be automatically also made in the accumulators 222 for the other contexts. The linking function as described above may be used only with the control bits of the DSP engine as all functionality of most implementations will require an initialization of these bits. However, according to other embodiments this linking function can be extended to more or all registers of a DSP context.

Figure 5:
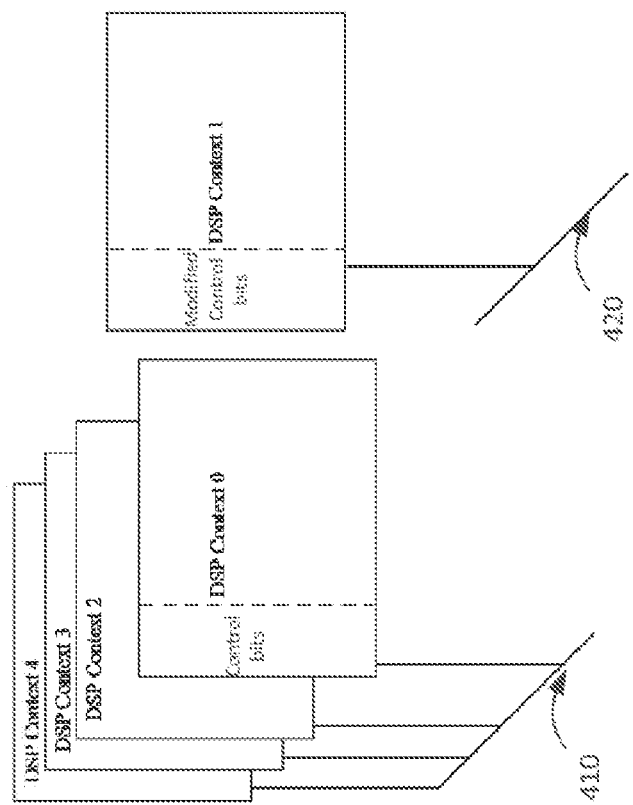
FIG. 5 shows a second exemplary configuration of a plurality of DSP contexts.

After a context switch from the background context (context 0) has been initiated and a modification of the DSP control register CORCON 260 has taken place, the respective DSP context will be taken out of the link 410. For example, a switch from context 0 to context 1 and a modification of the DSP control register 260 as shown in FIG. 5 will cause the DSP context 1 to be taken out of the link 410 and now can be individually altered through the separate access 420. In the embodiment which only links the control bits, the same effect is accomplished by taking these control bits out of the link as the remaining registers of the DSP context are already separate.

Thus, a separation of a DSP context requires that context switch from a background context CTX0 occurred and that the DSP control register CORCON 260 has been modified. Then, the DSP context of the new context will be taken out of the link 410. In the example shown in FIG. 5, the DSP context 1 will be taken out of the link in its current condition and the local CORCON DSP control bits (DSP context 1 in FIG. 5) will be updated accordingly; Subsequent writes to the background CORCON (DSP context 0) will no longer affect the local CORCON DSP control bits for DSP context 1, but still update all other contexts that are still linked through link 410 as shown in FIG. 5. This will apply to each DSP context until the next device reset occurs. Thus, a DSP context may stay in the linked status and be tied to the background context 0 or its link may be automatically severed once at least one DSP control bit of a context is altered after switching from the background context. Any switch to another context can cause a separation of the respective DSP context under the same conditions. As mentioned above, a change in the accumulators may not trigger a severance only a change of the general control of the DSP engine in the DSP control register 260 will trigger the separation from link 410.

It is assumed that in existing DSP engine code, such as the dsPIC33 core, the DSP engine configuration will be established within the background context (typically during initialization). As long as no context switch occurs any configuration or reconfiguration will affect automatically all other DSP contexts. Thus, the improved core design according to various embodiments can be fully backward compatible to a conventional core design. The various embodiments may not provide backwards compatibility only if: The user waits to configure the DSP engine from within another CPU context and assumes it will be valid elsewhere for DSP code execution. However, for backward compatibility purposes this scenario will be rather rare and is therefore acceptable.

Figure 1B:
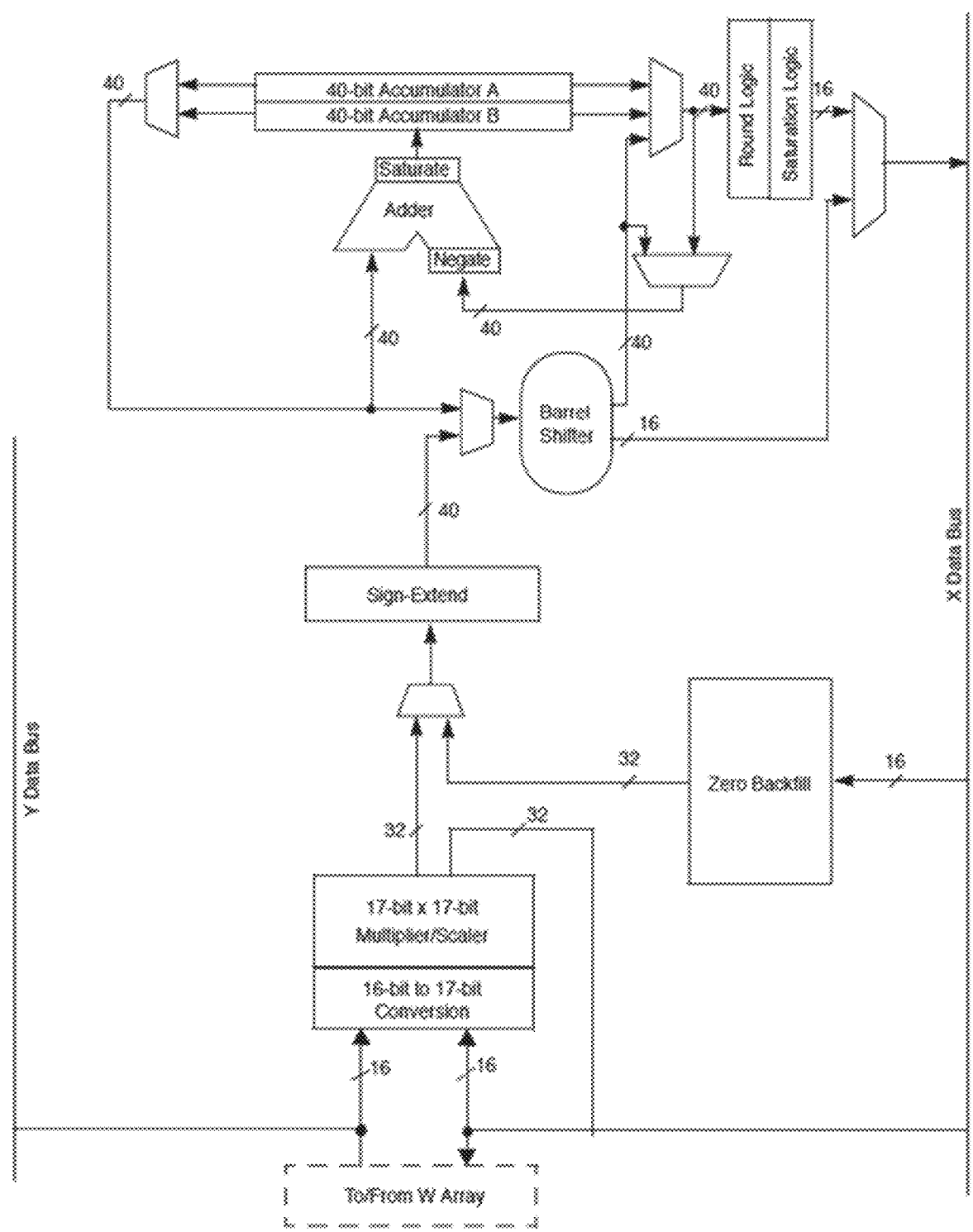
FIG. 1B shows details of the DSP engine.
Figure 6:
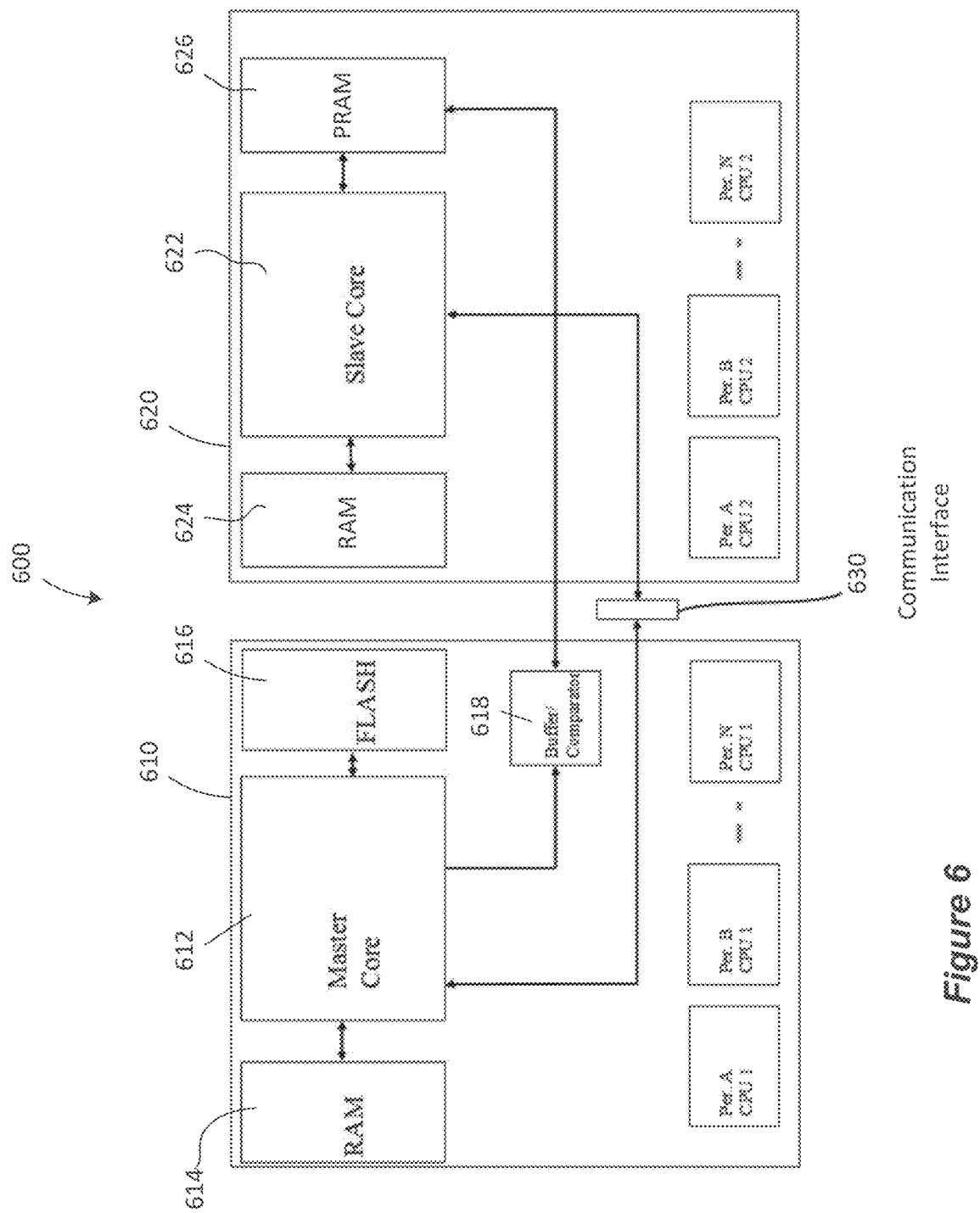
FIG. 6 shows a dual core microcontroller according to various embodiments.

The improved processing core with DSP capabilities may be further implemented in dual- or multi-core device. A dual core device may be designed as shown in FIG. 6 and comprise a master processing device and a slave processing device. Both processing devices may be designed according to FIGS. 1-3 and each may comprise associated peripheral devices as shown in FIG. 6 thereby each device may form a separate microcontroller within the integrated circuit device. A communication link module 630 may be provided to allow for control of the different processing cores. As shown in FIG. 6, a dual or multi core processing device 600 can be designed to have a master microcontroller 610 with a master central processing unit (CPU) 612 and one or slave units 620 each having a slave central processing unit 622 wherein a core design of each slave central processing unit 622 may be generally identical or similar to the core design of the master CPU 612 and in particular be designed with a DSP enhanced core as discussed above. However, according to other embodiments, the slave CPU 622 may be different from the master CPU 612 and only the slave CPU 622 may have the DSP capabilities discussed above. The master microcontroller has its own set of peripheral devices as shown in FIG. 6. A slave unit 620 may or may not have its own set of peripheral devices and, thus, form a microcontroller by itself. Thus, each master and slave device form more or less completely independent processing devices and may communicate with a dedicated bus or communication interface 630. FIG. 6 shows such a design with a master microcontroller 610 and a single slave microcontroller 620. A communication interface 630 is provided that allows for communication between the two cores 610, 620. Each processor 612, 622 may be designed in a Harvard architecture as shown. However, the principles according to the various embodiments may be easily translated into a von Neumann architecture. The master unit comprises, e.g., flash memory 616 used as the program memory and random access memory 614 used as data memory, each coupled with the master core 612.

As shown in FIG. 6, the slave unit 620 can be designed without flash memory. Instead a dedicated program random access memory 626 is provided. Due to the fact that this memory is volatile it will be loaded through the master 610 according to various embodiments. This design choice has the advantage that a bottleneck provided by flash technology is avoided. Flash memory is generally slower than RAM. Hence, there will be no read delays and the slave can be operated at a higher execution speed which may be very beneficial for certain high speed applications such as, e.g., SMPS applications. As stated above, more than one slave unit 620 may be implemented according to various embodiments. In case both cores are identical, the master core 612 can be designed to include additional instructions which may either not be implemented in the slave unit 622 or non functional in the slave unit. These additional instructions allow the transfer of data from the flash memory 616 or from an external source into the PRAM 626 of the slave device 620. For example, according to an embodiment, multiple cores may be implemented within a single chip device and each core may have an assigned configuration register, wherein one of the bits of such a register may define whether the respective unit is a master or a slave. Logic may be present that allows for only one of the cores to be set as a master. Once this bit has been set, the additional instruction may be allowed to be executed. In the other units (slaves) these instructions may not be executed, for example, they could be interpreted as illegal opcodes.

Control logic to access the PRAM 626 by the master unit 610 can be either located in the master unit as shown in FIG. 6 with buffer/comparator unit 618. Alternatively, a similar unit may be arranged within the slave unit 620. Either unit is designed to grant access of the PRAM either exclusively to the master unit 610 or to the slave unit 620. Other embodiments may place some part of the logic within the master core and other parts in the salve core or arrange the logic outside both units. Similarly, communication interface 630 may be insider either unit or entirely outside both units. Additional control for the PRAM access units 618 may be provided by the communication interface 630. The embodiments are not limited to a dual core implementation. A person skilled in the art will realize that other implementations are possible.

The invention claimed is:

1. An integrated circuit device comprising:
a first central processing unit including a digital signal processing (DSP) engine;
a plurality of contexts, each context comprising a CPU context comprising a plurality of registers within a register file and each context comprises a DSP context, wherein each DSP context comprises control bits controlling the DSP engine and a plurality of DSP registers including at least one register that is not part of the register file, wherein after a reset of the integrated circuit device the control bits of all DSP contexts are linked together such that data written to the control bits of a first active DSP context is written to respective control bits of all other DSP contexts and only after a context switch to another DSP context and a modification of at least one of the control bits of the another DSP context, the control bits of the another DSP context is severed from a link to form independent control bits of a new active DSP context.

2. The integrated circuit device according to claim 1, wherein the control bits are part of a control register.

3. The integrated circuit device according to claim 2, wherein at least some of the control bits are part of a status register comprising further bits.

4. The integrated circuit device according to claim 2, wherein after a reset of the integrated circuit device all registers of each DSP context are linked together such that data written to one register of one the DSP contexts is written to respective registers of all other DSP contexts and only after a context switch to another context and a modification of the control register of the another DSP context, the registers of the another context are severed from the link to form independent registers of the DSP context.

5. The integrated circuit device according to claim 1, wherein the DSP context comprises at least a predefined number of bits of a status register indicating a status of the DSP engine.

6. The integrated circuit device according to claim 1, wherein the plurality of DSP registers comprises at least one accumulator.

7. The integrated circuit device according to claim 6, wherein modification of the at least one accumulator after a context switch does not trigger a severance of an associated DSP context.

8. The integrated circuit device according to claim 1, wherein the plurality of DSP registers comprises at least one working register within the register file.

9. The integrated circuit device according to claim 8, wherein the plurality of DSP registers comprise at least one further working register within the register file.

10. The integrated circuit device according to claim 1, wherein the control bits are part of a DSP engine control register operable to control and configure the DSP engine.

11. The integrated circuit device according to claim 10, wherein the DSP engine control register comprises loop control bits, accumulator control bits, and at least one multiplier control bit.

12. The integrated circuit device according to claim 11, wherein the DSP engine control register further comprises a CPU interrupt priority control bit.

13. The integrated circuit device according to claim 10, wherein the DSP engine control register comprises a program space visibility control bit.

14. The integrated circuit device according to claim 1, wherein after severance of a DSP context a subsequent reset of the integrated circuit device again links all DSP control bits.

15. The integrated circuit device according to claim 1, comprising a second central processing unit.

16. The integrated circuit device according to claim 15, wherein the second central processing unit operates as a master and the first central processing unit operates as a slave.

17. The integrated circuit device according to claim 16, wherein the first central processing unit is a processing unit of a first microcontroller unit of the integrated circuit device and the second central processing unit is a processing unit of a second microcontroller unit of the integrated circuit device.

18. The integrated circuit device according to claim 17, wherein the first microcontroller unit comprises random access program memory that is configured to be loaded by the second central processing unit through an interface coupling the second microcontroller unit and the random access program memory.

19. A method for operating an integrated circuit device comprising a first central processing unit including a digital signal processing (DSP) engine, the method comprising:
   providing a plurality of contexts, each context comprising a CPU context and a DSP context, wherein the DSP context comprises control bits controlling the DSP engine and a plurality of DSP registers including at least one accumulator,
   resetting the integrated circuit device, wherein a reset causes the control bits of all DSP contexts to be linked together such that data written to a DSP control bit of a first active DSP context is written to respective control bits of all other DSP contexts; and
   switching to another DSP context and modifying of at least one control bit of the another DSP context, wherein the control bits of the another DSP context are severed from link to form independent control bits.

20. The method according to claim 19, wherein the control bits are part of a control register.

21. The method according to claim 20, wherein at least some of the control bits are part of a status register comprising further bits.

22. The method according to claim 20, wherein after a reset of the integrated circuit device all registers of each DSP context are linked together such that data written to one register of one DSP context is written to respective registers of all other DSP contexts and only after a context switch to another context and a modification of the control register of the another DSP context, the registers of the another context are severed from the link to form independent registers of the DSP context.

23. The method according to claim 20, further comprising controlling the DSP engine with the control register comprising said control bits.

24. The method according to claim 19, wherein the DSP context comprises at least a predefined number of bits of a status register indicating a status of the DSP engine.

25. The method according to claim 19, wherein the DSP context comprises two accumulators.

26. The method according to claim 25, wherein modification of at least one accumulator after a context switch does not trigger a severance of an associated DSP context.

27. The method according to claim 19, wherein the DSP context comprises at least one working register used for the DSP engine.

28. The method according to claim 27, wherein the DSP context comprises at least one further working register.

29. The method according to claim 19, wherein after severance of a DSP context a subsequent reset of the integrated circuit device again links all DSP control bits.

30. An integrated circuit device comprising:
   a first central processing unit including a digital signal processing (DSP) engine;
   a plurality of contexts, each context comprises a CPU context comprising a plurality of registers and each context comprises a DSP context, wherein each DSP context comprises control bits controlling the DSP engine and a plurality of DSP registers including at least one accumulator,
   wherein after a reset of the integrated circuit device all control bits and registers of each DSP context are linked together such that data written to a register of any one DSP context is written to respective registers of all other DSP contexts and only after a context switch to another DSP context and a modification of a control register of the another DSP context, the registers of the another DSP context are severed from a link to form independent registers of the DSP context.

* * * * *